(12) United States Patent
Mulberg et al.

(10) Patent No.: US 7,602,770 B2
(45) Date of Patent: Oct. 13, 2009

(54) TELECOMMUNICATION TERMINAL IDENTIFICATION ON A SWITCHING SYSTEM

(75) Inventors: Alan Stuart Mulberg, Denver, CO (US); Roger Leon Toennis, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 1150 days.

(21) Appl. No.: 10/925,180

(22) Filed: Aug. 23, 2004

(65) Prior Publication Data

US 2006/0039544 A1 Feb. 23, 2006

(51) Int. Cl.
*H04L 12/66* (2006.01)
(52) U.S. Cl. .................. 370/354; 379/191; 379/197; 379/198; 379/211.02; 379/232
(58) Field of Classification Search .............. 370/356, 370/354
See application file for complete search history.

(56) References Cited

U.S. PATENT DOCUMENTS 6,577,726 B1 * 6/2003 Huang et al. ........... 379/265.02
7,151,825 B2 * 12/2006 Idoni et al. ............. 379/201.02
2004/0243701 A1 * 12/2004 Hardwicke et al. .......... 709/224
2004/0264665 A1 * 12/2004 Idoni et al. ............. 379/201.01

* cited by examiner

*Primary Examiner*—Simon Sing
*Assistant Examiner*—Akelaw A Teshale
(74) *Attorney, Agent, or Firm*—John C. Moran

(57) ABSTRACT

A method and apparatus for identification of telephone numbers for IP telephones in offices to be assigned to different persons by (1) assigning one of the offices to one of the persons upon a request from the one of persons; (2) accessing a physical network address for an IP telephone located in the assigned one of the offices; (3) obtaining a telephone number for the one of the persons; (4) determining from the accessed physical network address an IP address of the IP telephone; (5) transmitting a message having the telephone number and IP address to a telecommunication switching system to which the IP telephone is interconnected; and (6) assigning the telephone number to the IP address by the telecommunication switching system in response to the message thereby assigning the telephone number to the IP telephone.

8 Claims, 9 Drawing Sheets

TELECOMMUNICATION TERMINAL IDENTIFICATION ON A SWITCHING SYSTEM

TECHNICAL FIELD

The present invention relates to telecommunication systems, and, in particular, to the assignment of telecommunication identification numbers to telecommunication terminals.

BACKGROUND OF THE INVENTION

As corporations and other entities have increased the numbers of their employees working mostly off-site, i.e., out of the office, the concept of "shared desk" often referred to, as a "hot desk" has become common. Using a hot desk, instead of each employee having their own individually assigned desk, employees are assigned an empty desk when they come into the office. However, a problem arises in that the telephone at the assigned desk does not have the employee's telephone associated with it. It is necessary that a telephone number be assigned to every telephone so that emergency telephone calls can be made. Note that certain telecommunication switching systems allow emergency calls to be placed from a telephone without a telephone number being assigned to the telephone. This requires that every telephone have a default telephone number. To resolve this problem for employee, the employee must transmit this default telephone number to people with whom they may need to communicate.

A telecommunication switching system can be manually reconfigured for each assignment of a desk. However, it is inconvenient and expensive to manually reconfigure the telecommunication switching system to assign an employee's telephone number to a new telephone each time an employee sits at a new desk. Further, the reconfiguration must be manually undone once the employee is no longer using the desk.

The assignment of a telephone number that is unique to the employee is not only important because other people may want to contact them, but also so that the features and utilization of the indicators and buttons on the telephone set can be customized for the employee.

Within the prior art, one solution to the above problem is to have specially equipped telephone sets that accept magnetic cards, similar to credit cards, which define the user to the telephone switching system. The disadvantage of this technique is the need for specially developed telephone sets.

In addition, certain telecommunication switching systems provide features for wired telephones utilizing the ISDN or proprietary protocols that allow a telephone set to have its telephone number modified by a user through the use of a feature code, a secret code, and the employee's extension number. After the employee enters this information, the telephone will be tailored to the needs of the user. Unfortunately, this prior art solution does require a number of manual operations on the part of the user.

Another prior art solution that has been used by some entities is to assign employees only wireless telephones, which they can then carry to any desk within the office complex. The same user always uses the wireless telephone; hence, it always has the correct telephone number.

SUMMARY OF THE INVENTION

A method and apparatus for identification of telephone numbers for IP telephones in offices to be assigned to different persons by (1) assigning one of the offices to one of the persons upon a request from the one of persons; (2) accessing a physical network address for an IP telephone located in the assigned one of the offices; (3) obtaining a telephone number for the one of the persons; (4) determining from the accessed physical network address an IP address of the IP telephone; (5) transmitting a message having the telephone number and IP address to a telecommunication switching system to which the IP telephone is interconnected; and (6) assigning the telephone number to the IP address by the telecommunication switching system in response to the message thereby assigning the telephone number to the IP telephone.

DETAILED DESCRIPTION

Figure 1:
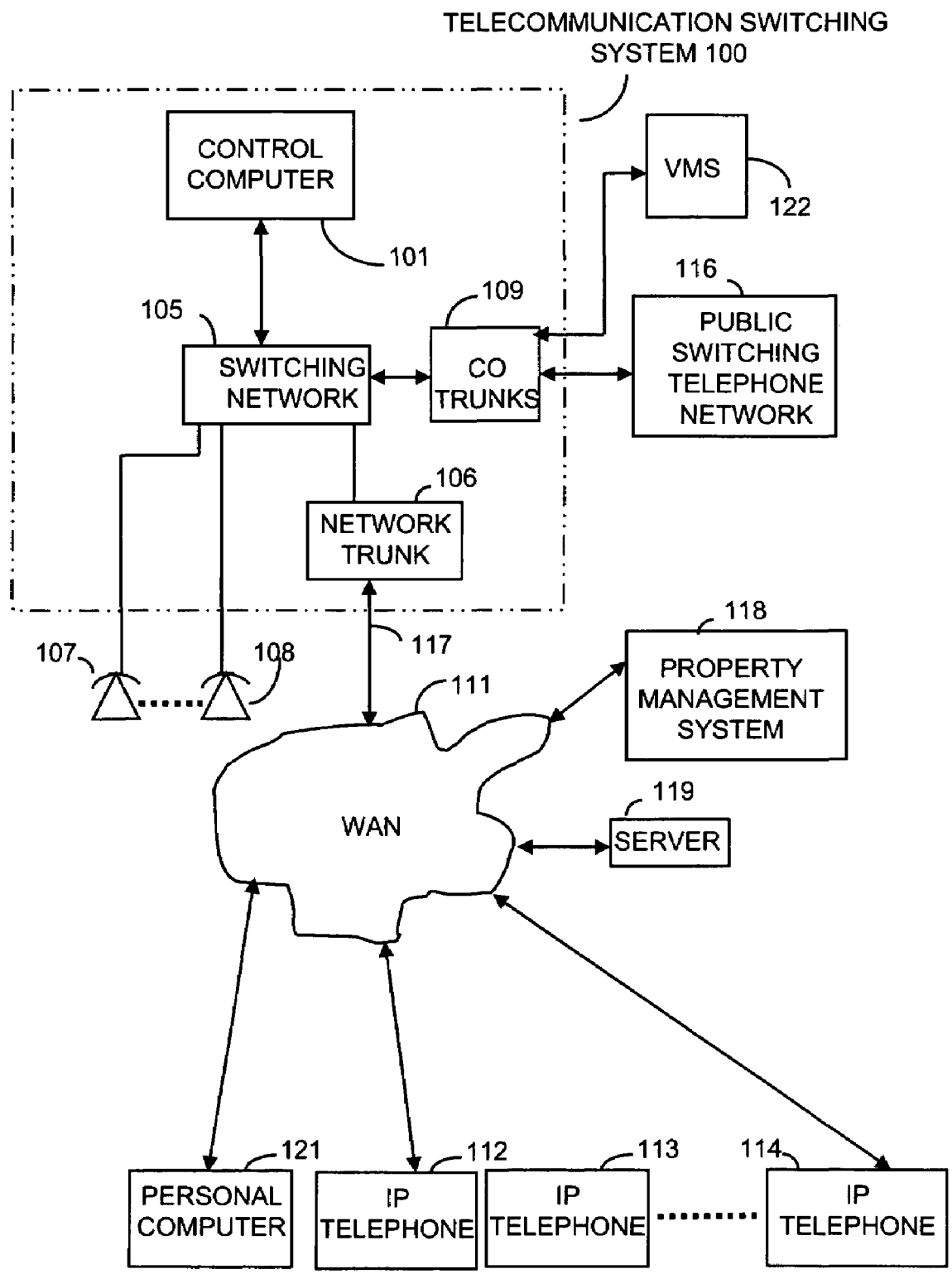
FIG. 1 illustrates, in block diagram form, an embodiment of the invention.

FIG. 1 illustrates, in block diagram form, an embodiment of the invention. Telecommunication switching system 100 is providing telephone service for IP telephones 112-114 via wide area network (WAN) 111. In addition, telecommunication switching system 100 may provide service for telephones such as telephones 107-108 that are directly connected to switching network 105 utilizing a proprietary digital protocol, an ISDN protocol, or an analog protocol. Telecommunication switching system 100 interconnects to public switching telephone network 116 via central office trunks 109. Telecommunication switching system 100 interfaces to WAN 111 via network trunk 106. Control computer 101 controls the overall operation of telecommunication switching system 100.

As will be described in greater detail later, server 119 may perform certain telecommunication functions for IP telephones 112-114 in conjunction with telecommunication switching system 100. Property management system 118 is a server that is used by employees needing an office for some relatively short period of time. The employee can request an office, and property management system 118 assigns an office, and interacts with server 119 in one embodiment or interacts with telecommunication switching system 100 to have the IP telephone in the assigned office assume the employee's telecommunication profile which includes the telephone number assigned to the employee.

When an employee desires to have an office assigned (normally, when the employee first comes into the office building), the employee communicates with property management system 118 via personal computer 121. The employee requests an office and designates an amount of time for which the employee is requesting the office. In response, property management system 118 determines a free office, assigns that office to the employee, and informs the employee of the location of the newly assigned office. Property management system 118 then communicates with server 119 in one embodiment to have the employee's telephone profile assigned to the IP telephone that is in the newly assigned office. In another embodiment, the functions of server 119 are performed by telecommunication switching system 100, and property management system 118 communicates only with telecommunication switching system 100 to accomplish the assignment of the employee's telephone profile to the IP telephone in the newly assigned office.

Property management system 118 knows the MAC address for each IP telephone 112-114 and correlates this address with the office in which the IP telephone is located. Upon assigning an office to a particular employee, the property management system determines the IP telephone in the office by the MAC address. Property management system 118 transmits to either server 119 or directly to telecommunication switching system 100 the MAC address, current telephone number, and the employee's telephone. In one embodiment, the length of time that the employee will be utilizing the office is also sent so that server 119 or telecommunication switching system 100 can time how long the employee will be allowed to use the office. These operations are explained in further detail with respect to the embodiments discussed below.

Consider now the embodiment where server 119 is utilized in the provision of telecommunication service for IP telephones 112-114. In this embodiment, server 119 logs into telecommunication switching system 100 as IP telephones 112-114. Assuming initially that none of the offices containing IP telephones 112-114 are assigned, server 119 logs into telecommunication switching system 100 using the default number for each of the IP telephones as each becomes active in one embodiment. In another embodiment, server 119 does not log in as a particular IP telephone with telecommunication switching system 100 using a default number, but rather utilizes use operations called unnamed registration feature which are performed by telecommunication switching system 100 and described in greater detail later. It is necessary to assign each IP telephone a default number or handle calls made from the IP telephone utilizing the unnamed registration operations for emergencies. It is necessary that an IP telephone in an office which is unassigned will still be able to contact emergency services. When an IP telephone becomes active, it transmits a message to server 119 within the message are the IP and MAC addresses of the IP telephone. Server 119 uses the IP address to log the IP telephone into telecommunication switching system 100 utilizing the default number or the unnamed registration feature. When property management system 118 transmits a message to server 119 designating that a particular IP telephone having a specified MAC address is to be assigned a telephone number associated with one of the employees, server 119 then logs into telecommunication switching system 100 as the IP telephone but with the employee's telephone number. Telecommunication switching system 100 is responsive to server 119 logging in as a particular telephone number to associate that number with the IP telephone's IP address. Consequently, telecommunication switching system 100 also associates the employees profile with the particular IP telephone. If a call is received from public switching telephone network 116 for the employee's telephone number, the call will then be directed first to server 119 which simply directs the control and audio information to the proper IP telephone. If a call is received for an employee who is not assigned an IP telephone, telecommunication switching system 100 simply directs the call to the employee's mail box associated with their telephone number on voice messaging system 122. In addition, system 100 may also direct the call to another telephone number used by the employee or to a call coverage path.

After the time has elapsed for which the employee had reserved the office, server 119 logs into telecommunication switching system 100 utilizing the default telephone number or request that telecommunication switching system 100 utilize the unnamed registration operations for any calls placed to or from the IP telephone. In one embodiment, server 119 will not perform these operations at the actual time if a voice conversation is in progress by the IP telephone. In another embodiment, property management system 118 informs server 119 when the time has elapsed for the employee in the assigned office causing server 119 to perform the re-registration of the IP telephone with telecommunication switching system 100. In addition, the employee can use personal computer 121 to indicate to property management system 118 that the employee is terminating their use of the office early or requesting additional time. In yet another embodiment, the employee can utilize their own personal computer to request early termination or an extension of the time allowed for the use of the office.

The advantage of utilizing server 119 as described in the previous paragraph, is that server 119 can be programmed and provided by a third party source different than the source for telecommunication switching system 100.

Figure 2:
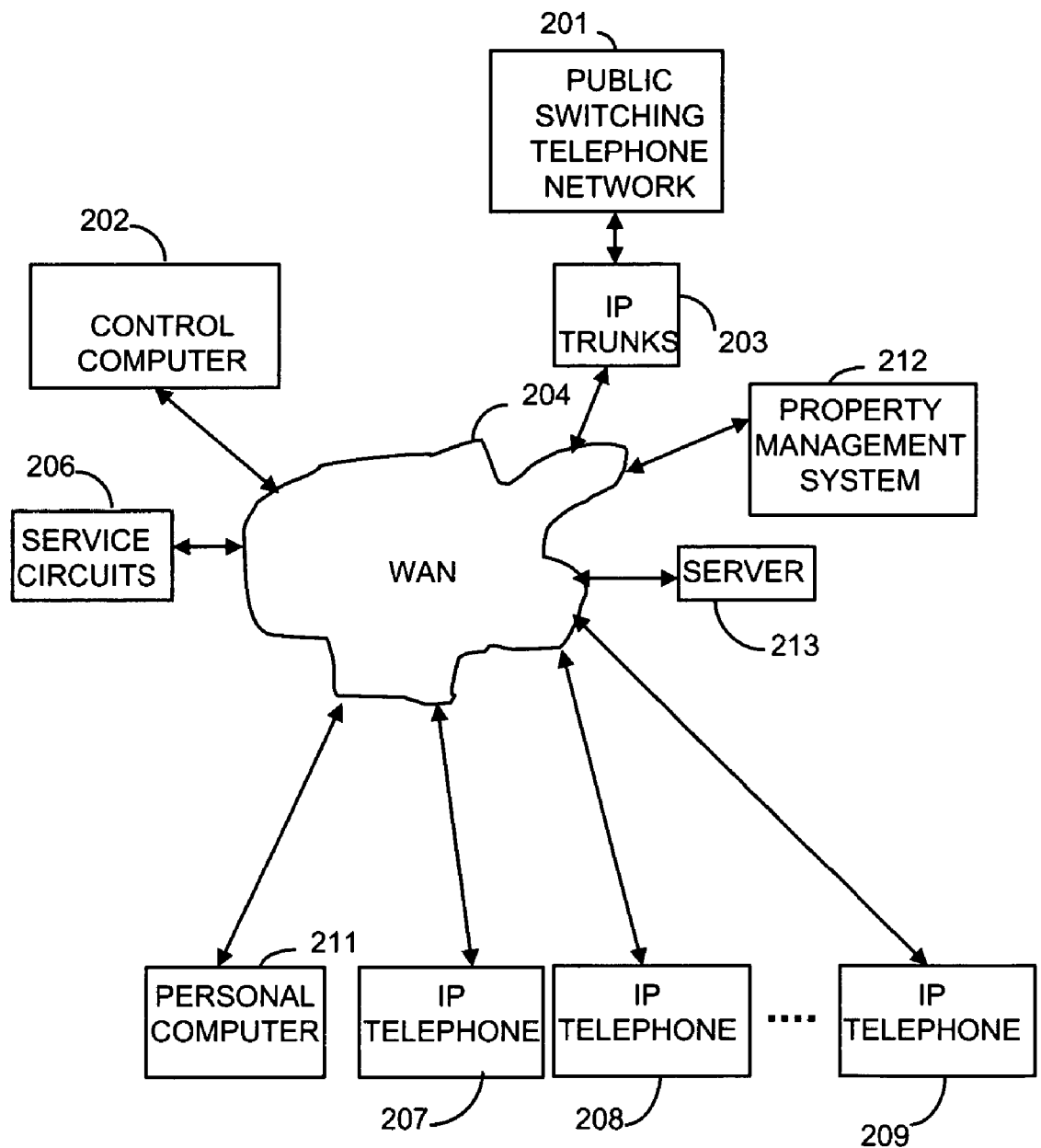
FIG. 2 illustrates, in block diagram form, another embodiment of the invention.

FIG. 2 illustrates, in block diagram for, another embodiment. In this embodiment the basic telecommunication control functions are being performed by control computer 202 utilizing service circuits 206 and IP trunks 203. All communication of voice information or control information is via WAN 204. Public switching telephone network 201 is interconnected to WAN 204 utilizing IP trunks 203. Elements 207-213 provide the same functions as elements 112-121 provided in FIG. 1.

Figure 3:
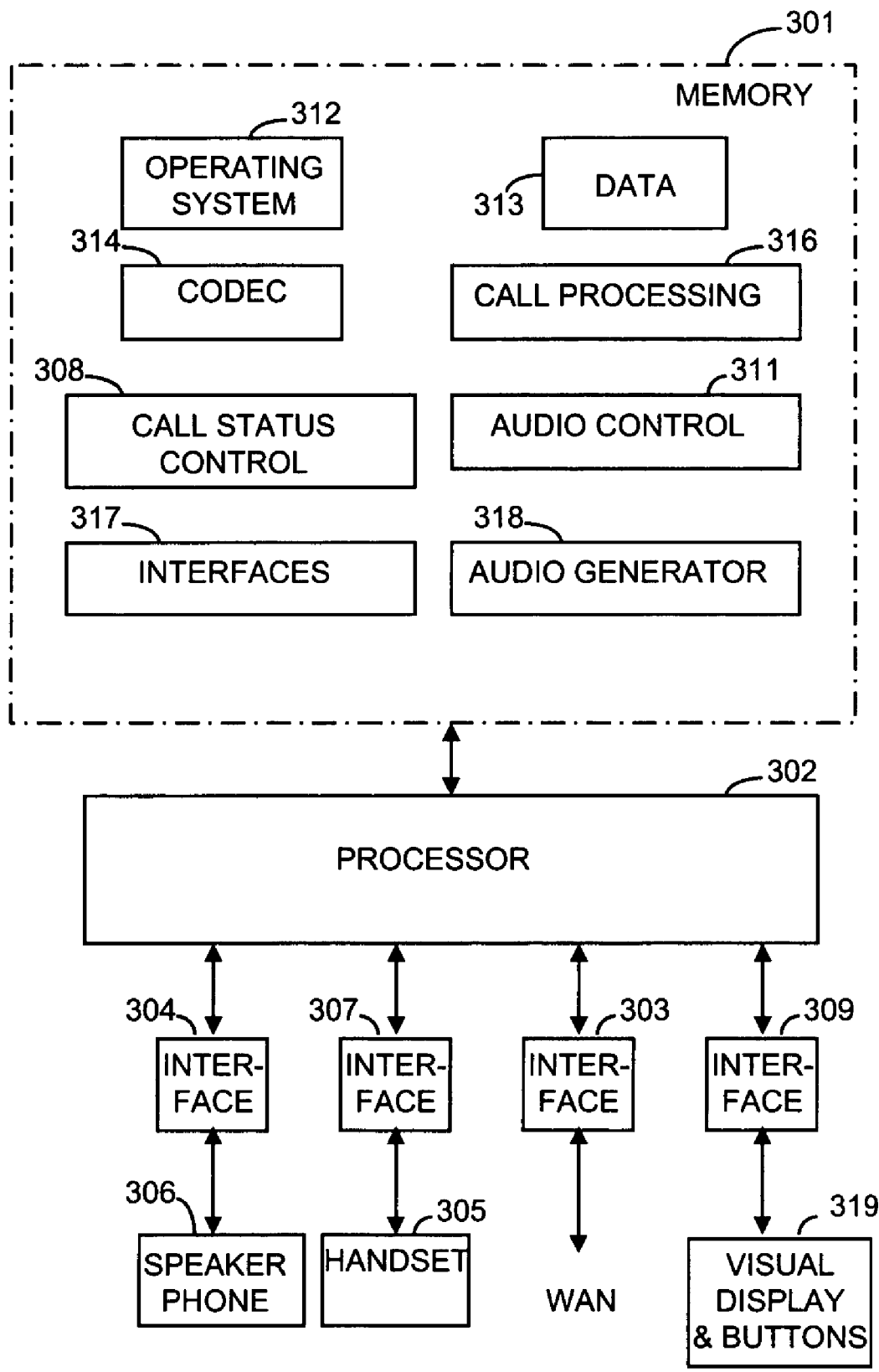
FIG. 3 illustrates, in block diagram form, an IP telephone.

FIG. 3 illustrates, in block diagram form, one embodiment of an IP telephone such as IP telephone set 112. Processor 302 provides the overall control for the functions of IP telephone set 112 by executing programs and storing and retrieving data from memory 301. Processor 302 connects to WAN via interface 303. Processor 302 interfaces to handset 305 via interface 307, interfaces to speaker phone 306 via interface 304, and connects to visual display and buttons 319 via interface 309. Processor 302 performs the operations of IP telephone set 112 by executing the routines illustrated in memory 301.

Operating system 312 provides the overall control and the necessary protocol operations. Operating system routine 312 provides all control functions required to implement the TCP/IP protocol as is well known to those skilled in the art. Data is stored in data block 313. CODEC 314 encodes and decodes the audio information for communication between handset 305 or conference speaker and microphone 306 and the WAN. Overall control of the call processing is performed by the IP telephone set 112 under the control of call processing routine 316. The communication and control of the various interfaces illustrated in FIG. 3 are provided by interfaces routine 317. Audio generator routine 314 implements other software methods for reproducing sounds.

Call status control routine 308 receives information from call processing routine 316 concerning control information received via WAN to update indicators or display of visual display and buttons 319. Similarly, call status control 308 receives actuation information for buttons or the keypad of block 319 from call processing routine 316.

The speaker of unit 306 or the receiver of handset 305 can be utilized for this reproduction of the audio call status information. Audio control 311 can utilize CODEC routine 314 to reproduce this audio call status information or audio generator routine 318. The audio information is transferred via the appropriate handset to either the speaker or receiver.

Figure 4:
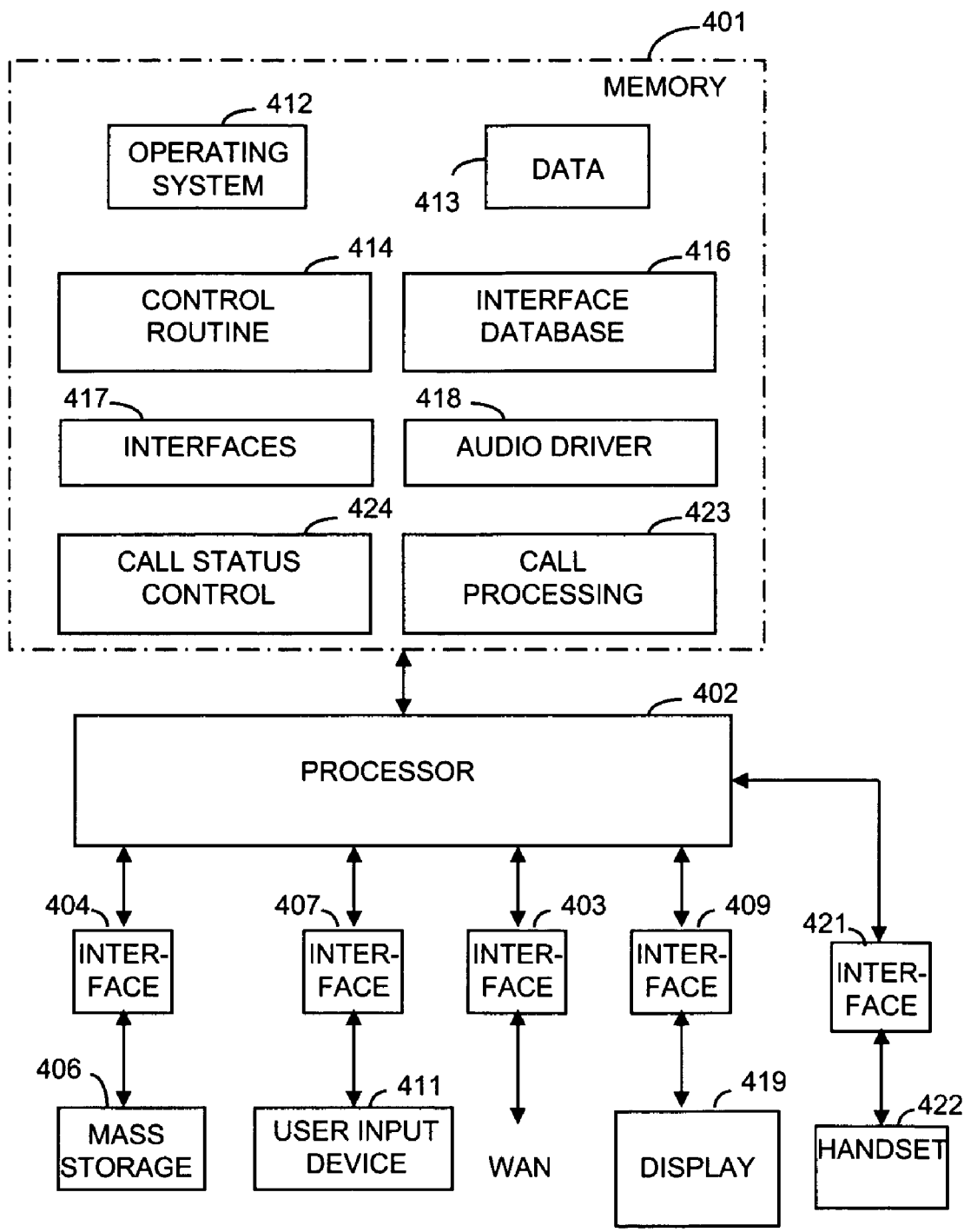
FIG. 4 illustrates, in block diagram form, a personal computer one of whose functions is to provide IP telephony operations.

FIG. 4 illustrates, in block diagram form, one embodiment of a computer that is providing IP telephony service for use in either FIG. 1 or 2. Processor 402 provides the overall control for the functions of a computer by executing programs and storing and retrieving data from memory 401. Processor 402 connects to WAN via interface 403. Processor 402 interfaces to user input device 411 via interface 407 and connects to display 419 via interface 409. Processor 402 performs the operations of a computer by executing the routines illustrated in memory 401. Interface 421 and handset 422 allow the implementation of a IP soft telephone.

Operating system 412 provides the overall control and the necessary protocol operations. Operating system routine 412 provides all control functions required to implement the TCP/IP protocol as is well known to those skilled in the art. Data is stored in data block 413. Interface database 416 stores preferences and options that define the user interface. Overall control is performed by control routine 414. The communication and control of the various interfaces illustrated in FIG. 4 are provided by interfaces routine 417. Audio driver 418 controls the reproduction of sounds. Call processing routine 423 and call status control routine 424 provide control for the telephony operations.

Figure 5:
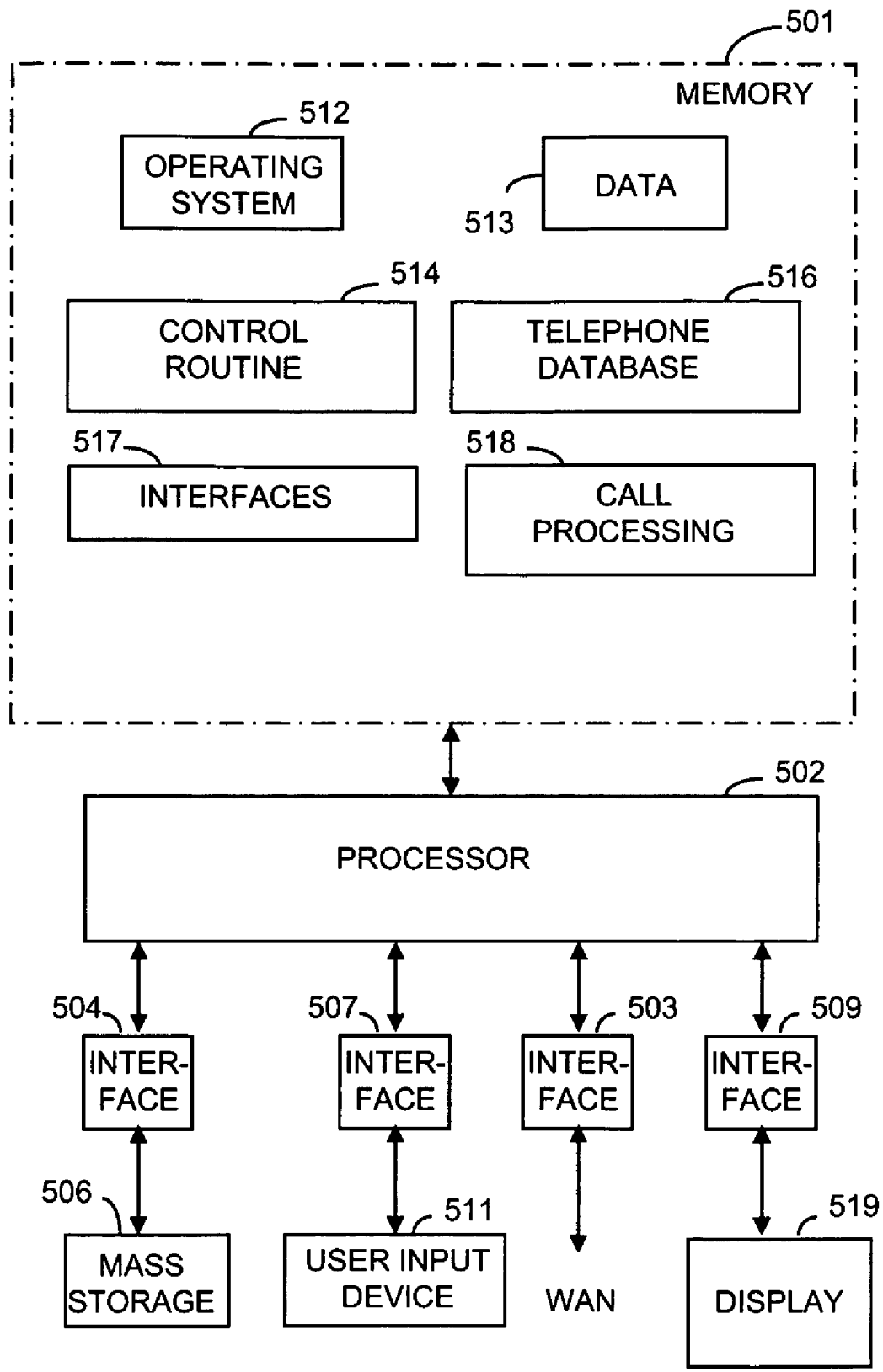
FIG. 5 illustrates, in block diagram form, a computer system configured as a server.

FIG. 5 illustrates, in block diagram form, one embodiment of a server such as server 119 or 213. Processor 502 provides the overall control for the functions of the sever by executing programs and storing and retrieving data from memory 501. Processor 502 connects to a WAN via interface 503. Processor 502 interfaces to user input device 511 via interface 507 and connects to display 519 via interface 509. Processor 502 performs the operations of the server by executing the routines illustrated in memory 501.

Operating system 512 provides the overall control and the necessary protocol operations. Data is stored in data block 513. Telephone database 516 stores the relationship between IP telephone addresses and MAC addresses. Overall control is performed by control routine 514. The communication and control of the various interfaces illustrated in FIG. 5 are provided by interfaces routine 517. Call processing routine 518 controls all operations with respect to the IP telephones, and these operations are illustrated by embodiment 800 of FIGS. 8 and 9.

Figure 6:
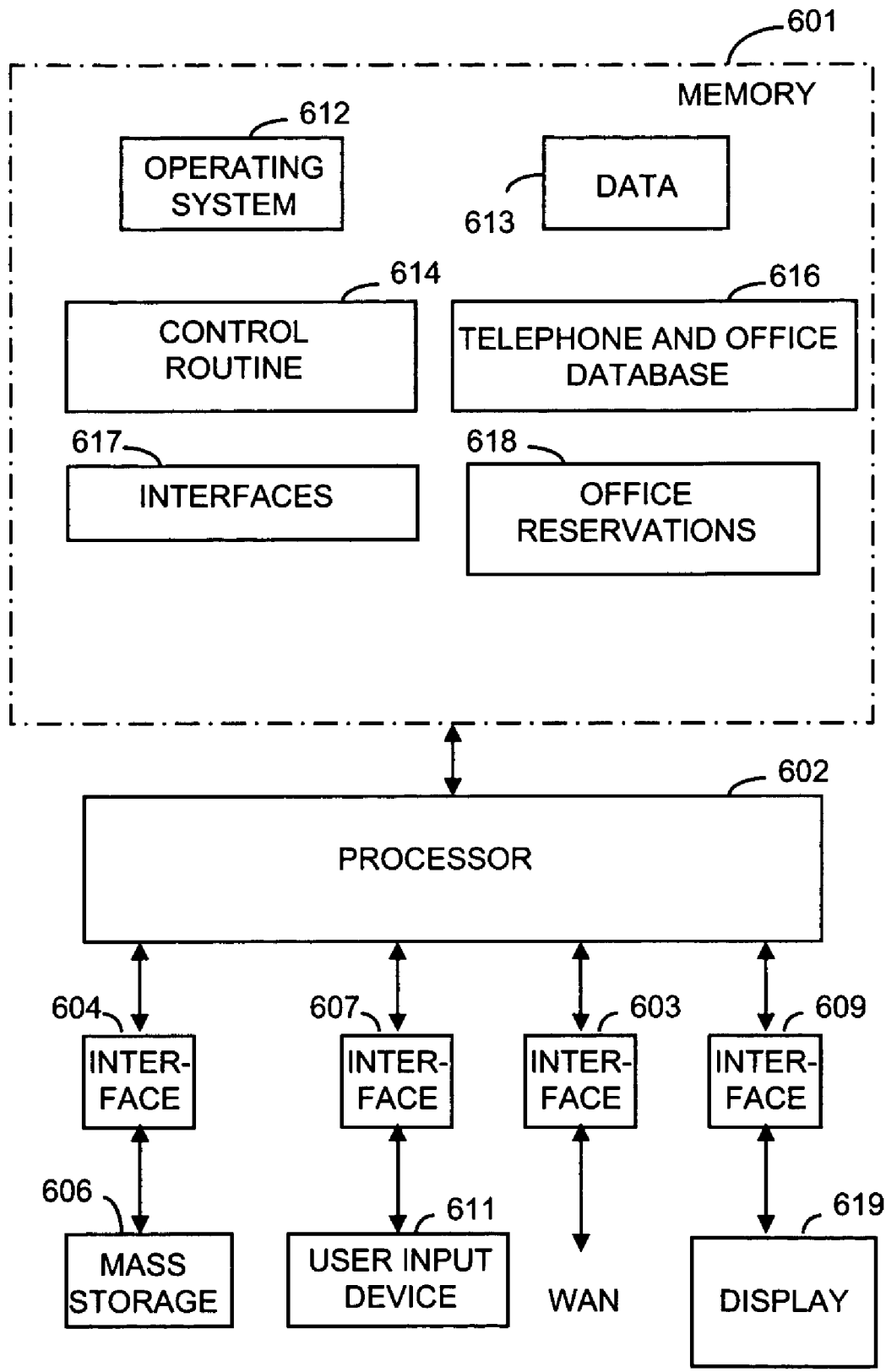
FIG. 6 illustrates, in block diagram form, a property management system.

FIG. 6 illustrates, in block diagram form, one embodiment of a property management system such as property management system 118 or 212. Processor 602 provides the overall control for the functions of the sever by executing programs and storing and retrieving data from memory 601. Processor 602 connects to a WAN via interface 603. Processor 602 interfaces to user input device 611 via interface 607 and connects to display 619 via interface 609. Processor 602 performs the operations of the property management system by executing the routines illustrated in memory 601.

Operating system 612 provides the overall control and the necessary protocol operations. Data is stored in data block 613. Telephone and office database 616 stores the relationship between offices and MAC addresses as well as the telephone numbers of users. Overall control is performed by control routine 614. The communication and control of the various interfaces illustrated in FIG. 6 are provided by interfaces routine 617. Office reservations routine 618 controls all operations with respect to the assignment of offices, and these operations are illustrated by embodiment 700 of FIG. 7.

Figure 7:
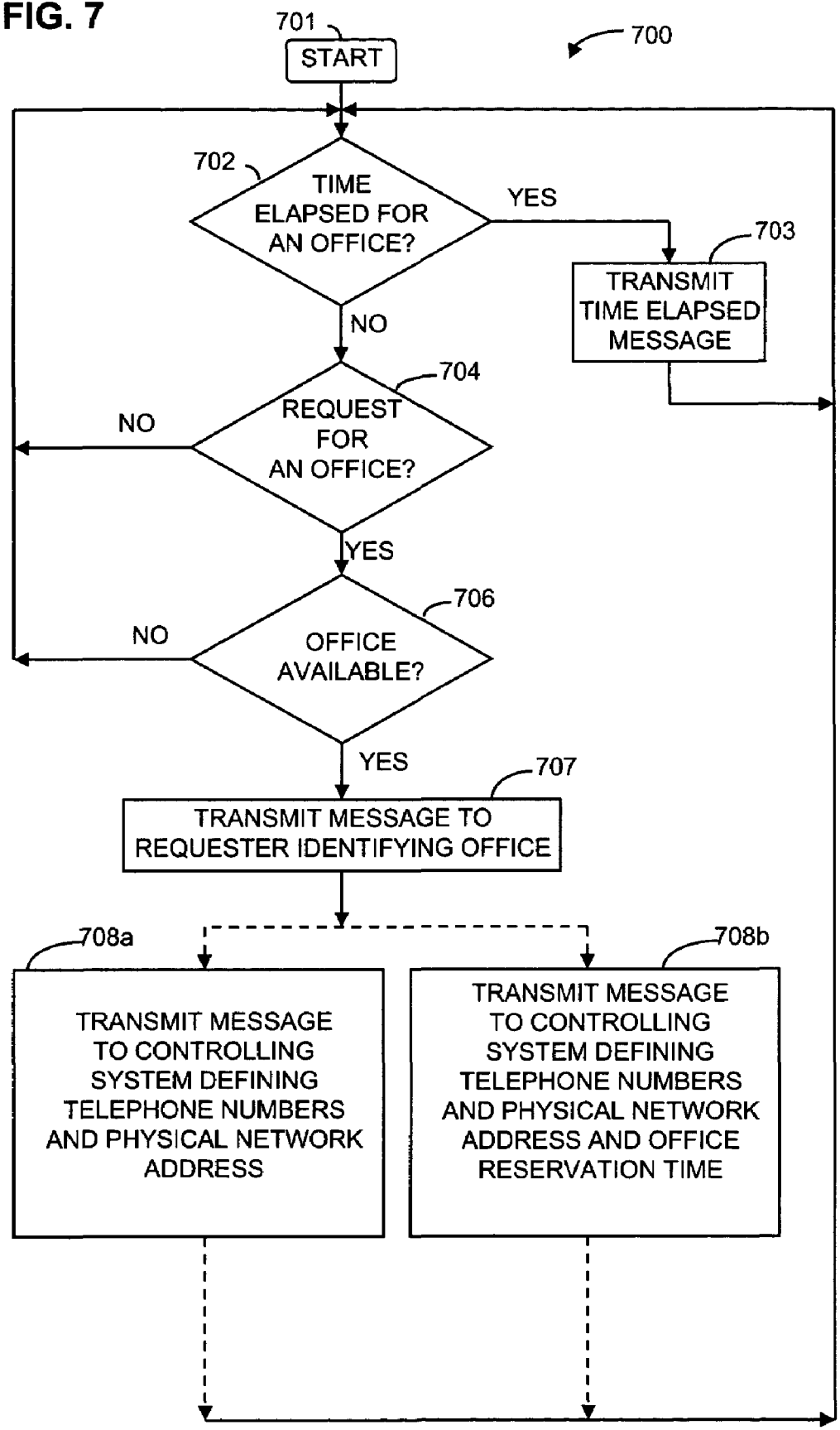
FIG. 7 illustrates, in flowchart form, operations performed by an embodiment for performing the operations of a property management system.

FIG. 7 illustrates embodiment 700 that performs operations of a property management system (PMS) such as property management system 118. After being started in block 701, in one embodiment, decision block 702 determines if time has elapsed for any offices that had been previously assigned. If the answer is yes, block 703 transmits a time lapse message to server 119 or telecommunication switching system 100 or the equivalence. Note, in another embodiment, the property management system does not determine when the time has elapsed for an office but rather the switching system or server performs this activity. If the answer in decision block 702 is no, decision block 704 determines if there is a request for an office. If the answer is no, control is returned back to decision block 702. If the answer is yes in decision block 704, decision block 706 determines if an office is available. If the answer is no, control is returned back to decision block 702. One skilled in the art could readily see that if the answer is no that the requestor would be informed that there is no office available. If the answer in decision block 706 is yes, block 707 transmits a message to the requestor identifying the office space that has been assigned to the requestor. In one embodiment where the property management system is timing the use of the office, block 708(a) transmits a message to the controlling system defining telephone numbers that will be utilized or that are presently assigned and the physical network address for the office which in one embodiment is the MAC address. In another embodiment, as illustrated by block 708(b), where the controlling system is going to time the usage of the office, the message transmitted to the controlling system defines the telephone numbers, physical network address, and the amount of time that the office is reserved for. After execution of block 708(a) or 708(b), control is returned back to decision block 702.

Figure 8:
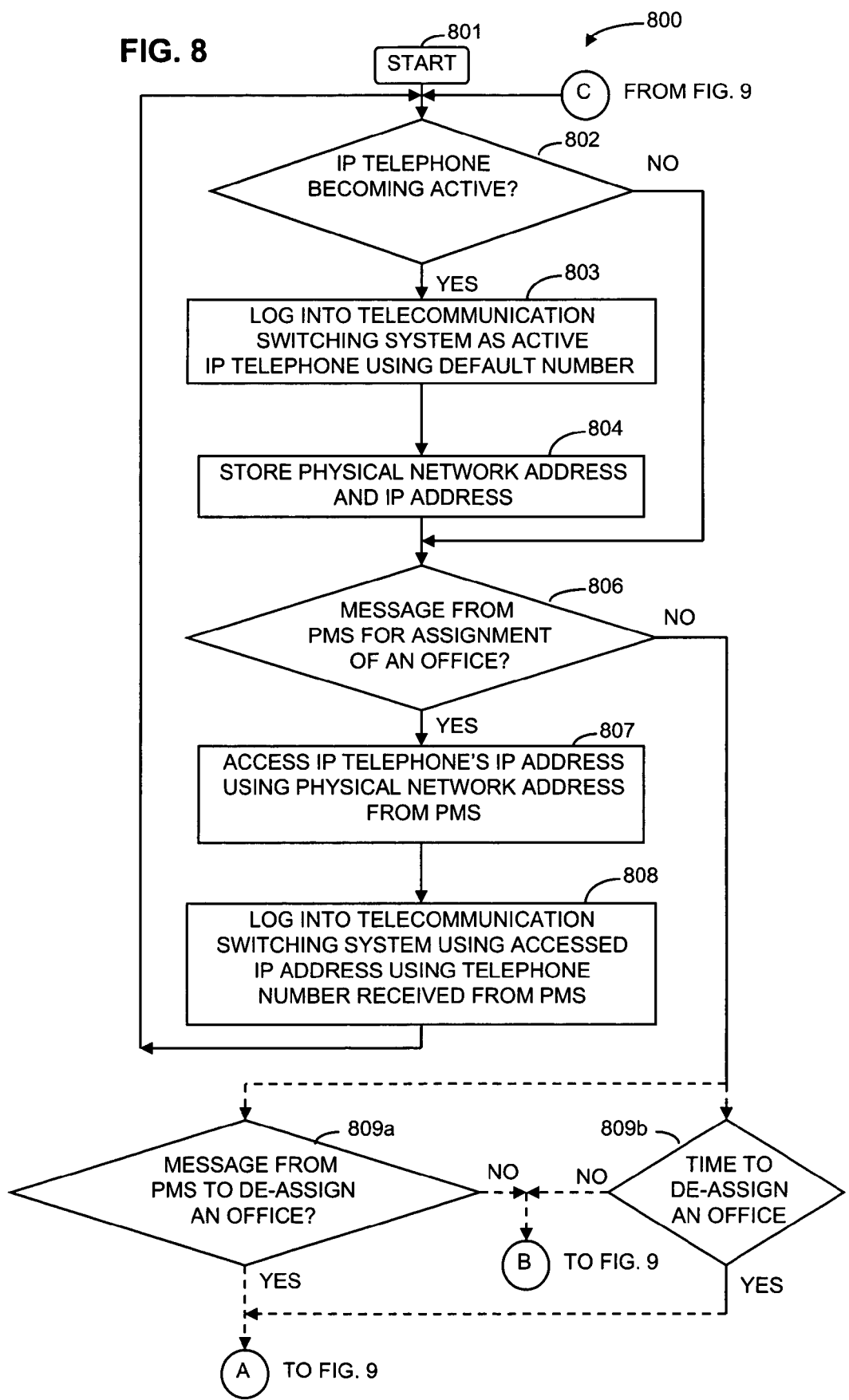
FIGS. 8 and 9 illustrate, in flowchart form, operations performed by an embodiment of a server.
Figure 9:
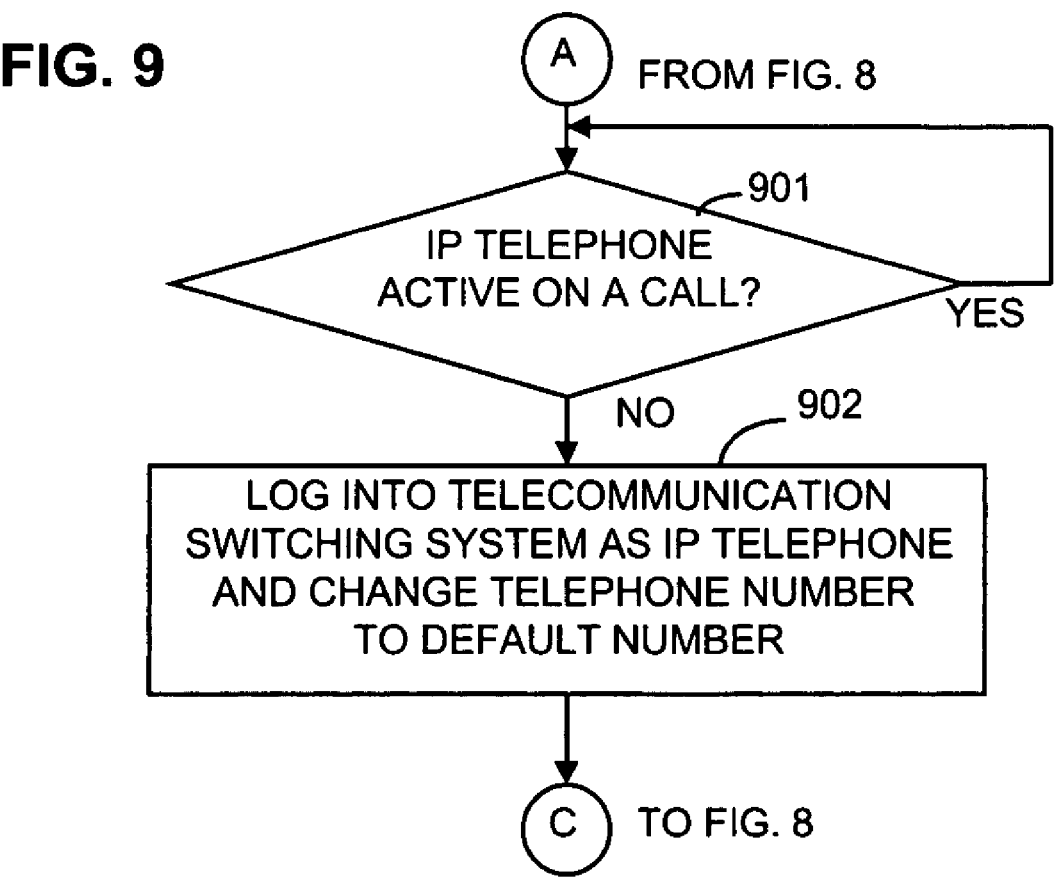
Figure 9:
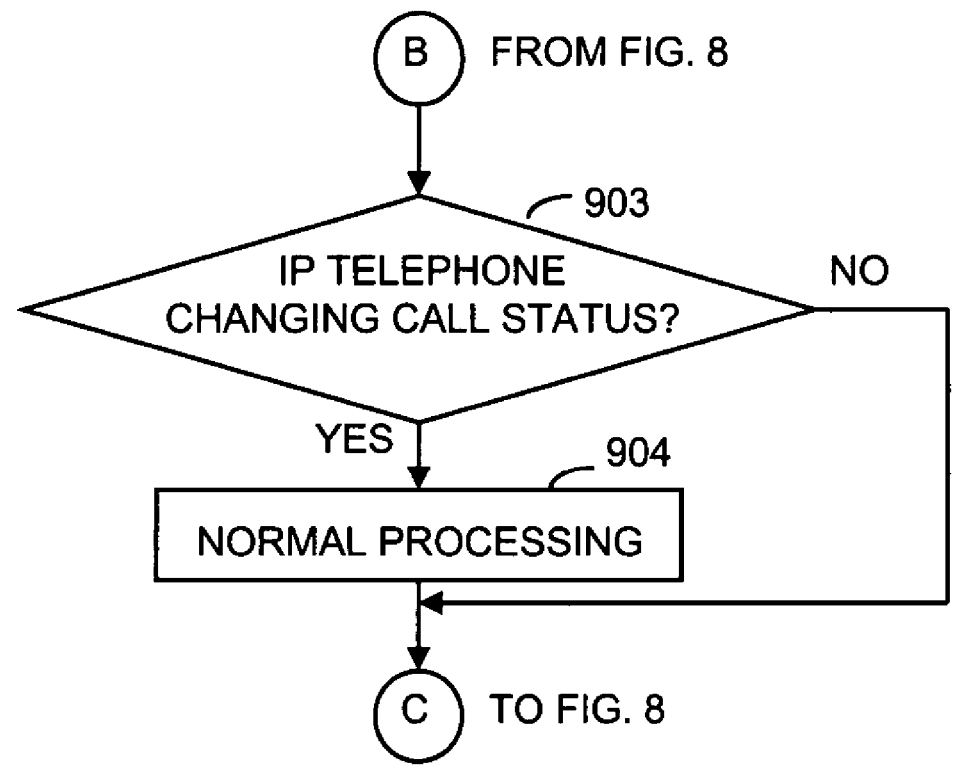

FIGS. 8 and 9 illustrate embodiment 800 that performs operations of a server such as server 119 or operations that may be provided by a switching system such as telecommunication system 100. After being started in block 801, decision block 802 determines if an IP telephone has become active and has transmitted its physical network address and IP address. If the answer is no, control is transferred to decision block 806. If the answer is yes, block 803 logs into the switching system as an active IP telephone using the default number or the unnamed registration feature, if available on the switching system, logs in specifying the IP address of the IP telephone. Next, block 804 stores the physical network address and the IP address so that the two can be correlated before transferring control to decision block 806.

Decision block 806 determines if a message has been received from the property management system (PMS) designating that an office is to be assigned. If the answer is no, control is transferred to blocks 809(a) or (b). If the answer is yes in decision block 806, block 807 utilizes the physical network address contained in the message from the property management system to access the previously stored IP telephone's IP address. Next, block 808 logs into the telecommunication switching system utilizing the access IP address as well as the telephone number received in the message from the property management system defining the employee's telephone number. The telecommunication switching system is responsive to this information to assign the employee's telephone number to the IP telephone's IP address. After execution of block 808, control is transferred back to decision block 802.

Returning now to decision block 806, if the answer is no in decision block 806, control is transferred to either decision block 809(a) or 809(b) depending upon which embodiment is being implemented. Control is transferred to decision block 809(a) if the property management system is responsible for determining when the employee's time has elapsed for utilization of the office. If the answer is no in decision block 809(*a*) that a message has not been received from the property management system to de-assign an office, control is transferred to decision block 903 of FIG. 9. If the answer in decision block 809(*a*) is yes, control is transferred to decision block 901 of FIG. 9. In the other embodiment, where the server is responsible for determining when the time has elapsed for an employee's usage of an office, decision block 809(*b*) determines if such a time has elapsed to de-assign an office. If the answer is no, control is transferred to decision block 903 of FIG. 9; and if the answer is yes, control is transferred to decision block 901 of FIG. 9.

If the answer is yes in either decision blocks 809(*a*) or 809(*b*), decision block 901 determines if the IP telephone that is physically present in the office to be de-assigned is active on a call. If the answer is yes, decision block 901 is re-executed until the IP telephone is no longer active on a call. If the answer in decision block 901 is no, block 902 logs into to the telecommunication switching system as the IP telephone and changes the telephone number assigned to the IP telephone to the default number or if the unnamed registration feature is available to a null number. After execution of block 902, control is transferred back to decision block 802.

If the answer is no in either of blocks 809(*a*) or 809(*b*), control is transferred to decision block 903 which determines if the IP telephone in the course of normal telephone activity is changing call status such as hanging up or originating a call, etc. If the answer in decision block 903 is no, control is transferred back to decision block 802 of FIG. 8. If the answer in decision block 903 is yes, block 904 performs normal processing for a call or activity before returning control back to decision block 802 of FIG. 8.

When the operations of a device are implemented in software, it should be noted that the software could be stored on any computer-readable medium for use by or in connection with any computer related system or method. In the context of this document, a computer-readable medium is an electronic, magnetic, optical or other physical device or means that can contain or store a computer program for use by or in connection with a computer related system or method. The device can be embodied in any computer-readable medium for use by or in connection with instruction execution system, apparatus, or device such as a computer-based system, processor-containing system, or other system that can fetch the instructions from the instruction execution system, apparatus, or device and exectite the instructions. In the context of this document, a "computer-readable medium" can be any means that can store the program for use by or in connection with the instruction execution system apparatus, or device. For example, the computer-readable medium can be, but is not limited to, an electronic, magnetic, optical, or semiconductor system, apparatus, or device. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where the device is implemented in hardware, the device can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intended advantages. It is therefore intended that such changes and modifications be covered by the following claims except insofar as limited by the prior art.

What is claimed is:

1. A system for identification of telephone numbers for IP telephones in a plurality of offices for assignment to different ones of a plurality of persons, comprising:

a property management system having a database that stores information about a plurality of offices and physical network addresses of IP telephones located in the plurality of offices with the physical network addresses being identified by office and that also stores telephone numbers identified by ones of a plurality of persons;

a server and the IP telephones directly connected to a packet switching network;

a telecommunication switching system interconnected to the IP telephones via the packet switching network;

the server detects physical network address and IP telephone address of each IP telephone as each becomes active;

the server in response to each IP telephone becoming active logs into the telecommunication switching system as each IP telephone by using the detected IP telephone address and a default telephone number or an unnamed registration feature;

the telecommunication switching system is responsive to the server logging in as each IP telephone using the default telephone number or the unnamed registration feature to provide telephone service for each IP telephone;

the property management system responsive to a request for an office from one of the plurality of persons to assign one of the plurality of offices to the one of plurality of persons and to transmit the physical network address of an IP telephone located in the assigned one of the plurality of offices and a telephone number of the one of the plurality of persons in a message to the server;

the server responsive to the message to compare the physical network address of the message with the detected physical network addresses to determine IP address of the IP telephone located in the assigned one of the plurality of offices and to re-log into the telecommunication switching system using the determined IP address and the telephone number of the message; and the telecommunication switching system responsive to the server re-logging into the telecommunication switching system to assign the telephone number of the message to the IP telephone located in the one of the plurality of offices.

2. The system of claim 1 wherein the one of the plurality of offices is assigned to the one of the plurality of persons for a period of time and the property management system transmits the period of time in the message to server; and the server responsive to the period of time elapsing to to re-log a second time into the telecommunication switching system using the IP address of the IP telephone and the default telephone number or the unnamed registration feature thereby unassigning the telephone number of the message to the IP telephone.

3. The system of claim 2 wherein the server delays with the second re-logging if the IP telephone is engaged in an active call operation.

4. The system of claim 1 wherein the one of the plurality of offices is assigned to the one of the plurality of persons for a period of time and the property management system responsive to the period of time elapsing to transmit another message to the telecommunication switching system to unassign the telephone number to the IP telephone.

5. The system of claim 4 wherein the property management system delays transmission of the other message if the IP telephone is engaged in an active call operation.

6. A server for assisting in identification of telephone numbers for IP telephones in a plurality of offices for assignment to different ones of a plurality of persons;
- a server and the IP telephones directly connected to a packet switching network;
- a telecommunication switching system interconnected to the IP telephones via the packet switching network;
- the server detects physical network address and IP telephone address of each IP telephone as each becomes active;
- the server in response to each IP telephone becoming active logs into the telecommunication switching system as each IP telephone by using the detected IP telephone address and a default telephone number or an unnamed registration feature whereby the telecommunication switching system provides telecommunication service to each IP telephone using the default telephone number or the unnamed registration feature;
- a property management system responsive to a request for an office from one of the plurality of persons to assign one of the plurality of offices to the one of plurality of persons and to transmit the physical network address of an IP telephone located in the assigned one of the plurality of offices and a telephone number of the one of the plurality of persons in a message to the server;
- the server responsive to a message from the property management system to compare the physical network address of the message with the detected physical network addresses to determine IP address of the IP telephone located in a one of the plurality of offices assigned by the property management system and to re-log into the telecommunication switching system using the determined IP address and the telephone number of the message to the telecommunication switching system interconnected to the IP telephones to have the telephone number assigned to the IP telephone located in the one of the plurality of offices by the telecommunication switching system.

7. The system of claim 6 wherein the one of the plurality of offices is assigned to the one of the plurality of persons for a period of time and the property management system transmits the period of time in the message to server; and
- the server responsive to the period of time elapsing to re-log a second time using the IP address of the IP telephone and the default telephone number of the unnamed registration feature thereby unassigning the telephone number of the message to the IP telephone.

8. The system of claim 7 wherein the server delays re-logging the second time if the IP telephone is engaged in an active call operation.

* * * * *